(12) United States Patent
Tanga An

(10) Patent No.: US 11,622,057 B2
(45) Date of Patent: Apr. 4, 2023

(54) IMAGE FORMING APPARATUS WHICH READS AND OUTPUTS IMAGE DATA OF AN AREA DESIRED BY A USER

(71) Applicant: KYOCERA Document Solutions Inc., Osaka (JP)

(72) Inventor: Janelle Tanga An, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 17/638,158

(22) PCT Filed: Aug. 20, 2020

(86) PCT No.: PCT/JP2020/031533
§ 371 (c)(1),
(2) Date: Feb. 24, 2022

(87) PCT Pub. No.: WO2021/039605
PCT Pub. Date: Mar. 4, 2021

(65) Prior Publication Data
US 2022/0407976 A1      Dec. 22, 2022

(30) Foreign Application Priority Data
Aug. 29, 2019  (JP) .............................. JP2019-156549

(51) Int. Cl.
*H04N 1/00*            (2006.01)

(52) U.S. Cl.
CPC ....... *H04N 1/00816* (2013.01); *H04N 1/0044* (2013.01); *H04N 1/00702* (2013.01); *H04N 1/00708* (2013.01); *H04N 1/00801* (2013.01); *H04N 1/00811* (2013.01); *H04N 1/00814* (2013.01); *H04N 2201/0094* (2013.01)

(58) Field of Classification Search
None
See application file for complete search history.

(56) References Cited

U.S. PATENT DOCUMENTS

| 5,778,276 A | 7/1998 | Hasegawa .................. 399/17 |
| 2019/0098170 A1* | 3/2019 | Kodimer ................. H04N 1/38 |
| 2019/0141213 A1* | 5/2019 | Mizude ................ H04N 1/3873 |

FOREIGN PATENT DOCUMENTS

| JP | 8-279884 A | 10/1996 |
| JP | 2000-332966 A | 11/2000 |
| JP | 2002-290723 A | 10/2002 |
| JP | 2009-260998 A | 11/2009 |

* cited by examiner

*Primary Examiner* — Andrew H Lam
(74) *Attorney, Agent, or Firm* — Stein IP, LLC

(57) ABSTRACT

An image forming apparatus (100) extracts from first image data (11) second image data (12), which is image data of a document, and accepts operation for selecting either a first preview image (71) corresponding to the first image data (11) or a second preview image (72) corresponding to the second image data (12). The image forming apparatus (100) outputs, when the first preview image (71) is selected, the first image data (11) and, when the second preview image (72) is selected, the second image data (12).

4 Claims, 14 Drawing Sheets

AFTER IMAGE PROCESSING
(IMAGE DATA TO BE OUTPUT)

AFTER IMAGE PROCESSING
(IMAGE DATA TO BE OUTPUT)

IMAGE FORMING APPARATUS WHICH READS AND OUTPUTS IMAGE DATA OF AN AREA DESIRED BY A USER

CROSS-REFERENCE TO RELATED APPLICATIONS

This application is a national stage of International Application No. PCT/JP2020/031533, filed Aug. 20, 2020, which claims the benefit of Japanese Application No. 2019-156549, filed Aug. 29, 2019, in the Japanese Patent Office, the disclosures of which are incorporated herein by reference.

TECHNICAL FIELD

The present invention relates to an image forming apparatus which is capable of reading a document.

BACKGROUND ART

An image forming apparatus that can read a document includes an image reading portion. The image reading portion reads a range set by a user (see, for example, Patent Document 1).

LIST OF CITATIONS

Patent Literature

Patent Document 1: JP-A-2009-260998

SUMMARY OF THE INVENTION

Problem to be Solved by the Invention

Some image forming apparatuses read a document set on a contact glass. They read, of a contact glass on which the document is set, a reading range set by a user.

The size of the documents set on the contact glass varies. A document of a regular size (for example, A4 size) may be set on the contact glass, or a document of an irregular size such as a driver's license, a health insurance card, or a business card (a card document smaller than the regular size) may be set on the contact glass.

Here, assume that, when the reading-target document is a card document smaller than A4 size, a user sets the reading range to A4 size. In this case, the user sets the card document within, of the contact glass, the range corresponding to A4 size.

In this example, the image forming apparatus sets, of the contact glass on which the card document is set, the range corresponding to A4 size as the reading range and reads the set reading range. Then, the image forming apparatus outputs image data of the read area (the area corresponding to the reading range).

The image data output from the image forming apparatus includes not only the image data of the document area (of the contact glass, the area where the card document is present) but also the image data outside the document area (of the contact glass, the area where the card document is not present). Thus, it is not convenient for a user who desires to output only the image data of the card document.

The present invention is devised to solve the above problem and its object is to provide an image forming apparatus that can output, of the image data obtained through reading, the image data of an area desired by a user.

Means for Solving the Problem

To achieve the above object, according to one aspect of the present invention, an image forming apparatus includes an operation panel that displays a screen and accepts operations from a user, an output portion that outputs data to an external device, an image reading portion that performs ordinary reading in which it reads a contact glass with a document set on it to generate first image data, which is the image data of the read area, and a control portion that performs output data selection processing. In performing output data selection processing, the control portion extracts from the first image data second image data, which is the image data of the document. The control portion also makes the operation panel display a first preview image corresponding to the first image data and a second preview image corresponding to the second image data, as well as makes the operation panel accept selection operation for selecting either the first or second preview image. When the first preview image is selected, the control portion makes the output portion output the first image data. When the second preview image is selected, the control portion makes the output portion output the second image data.

Advantageous Effects of the Invention

With a configuration according to the present invention, it is possible to provide an image forming apparatus that can output, of the image data obtained through reading, the image data of an area desired by a user.

DESCRIPTION OF EMBODIMENTS

<Structure of a Multifunction Peripheral>

Figure 1:
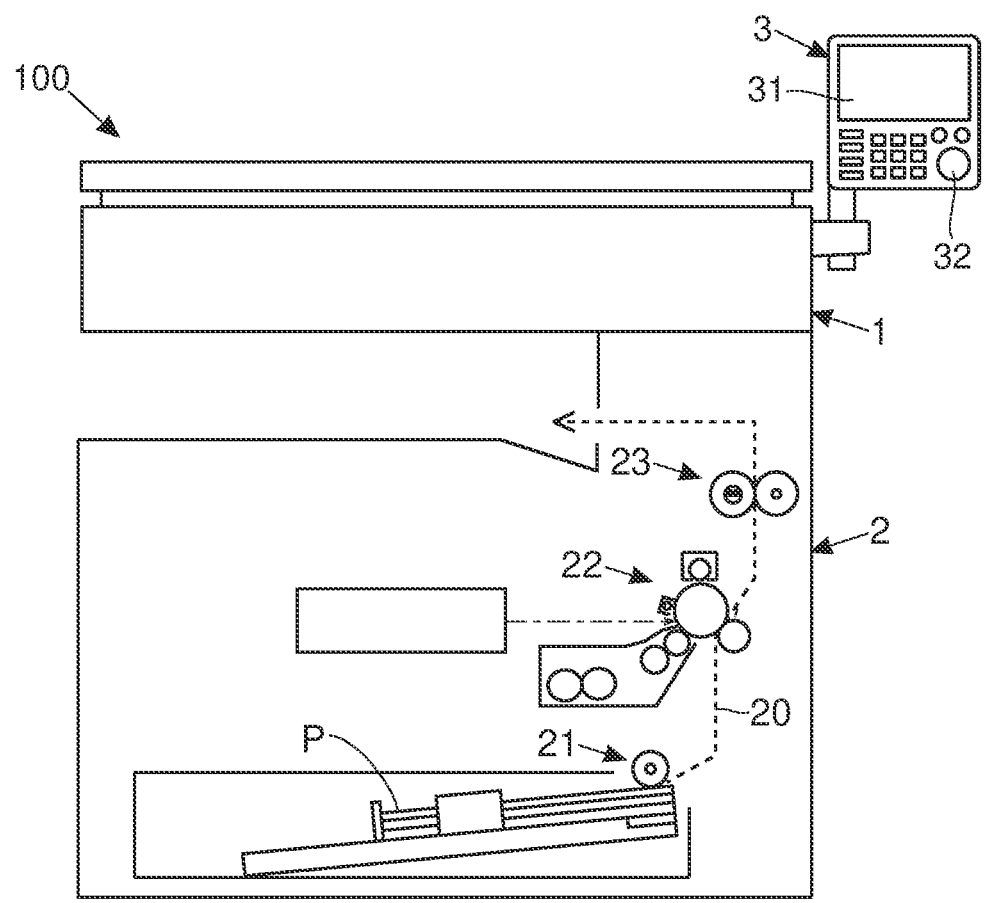
FIG. 1 is a schematic diagram showing a construction of a multifunction peripheral according to an embodiment of the present invention.

As shown in FIG. 1, a multifunction peripheral 100 according to an embodiment includes an image reading portion 1 and a printing portion 2. The multifunction peripheral 100 corresponds to an "image forming apparatus".

Figure 2:
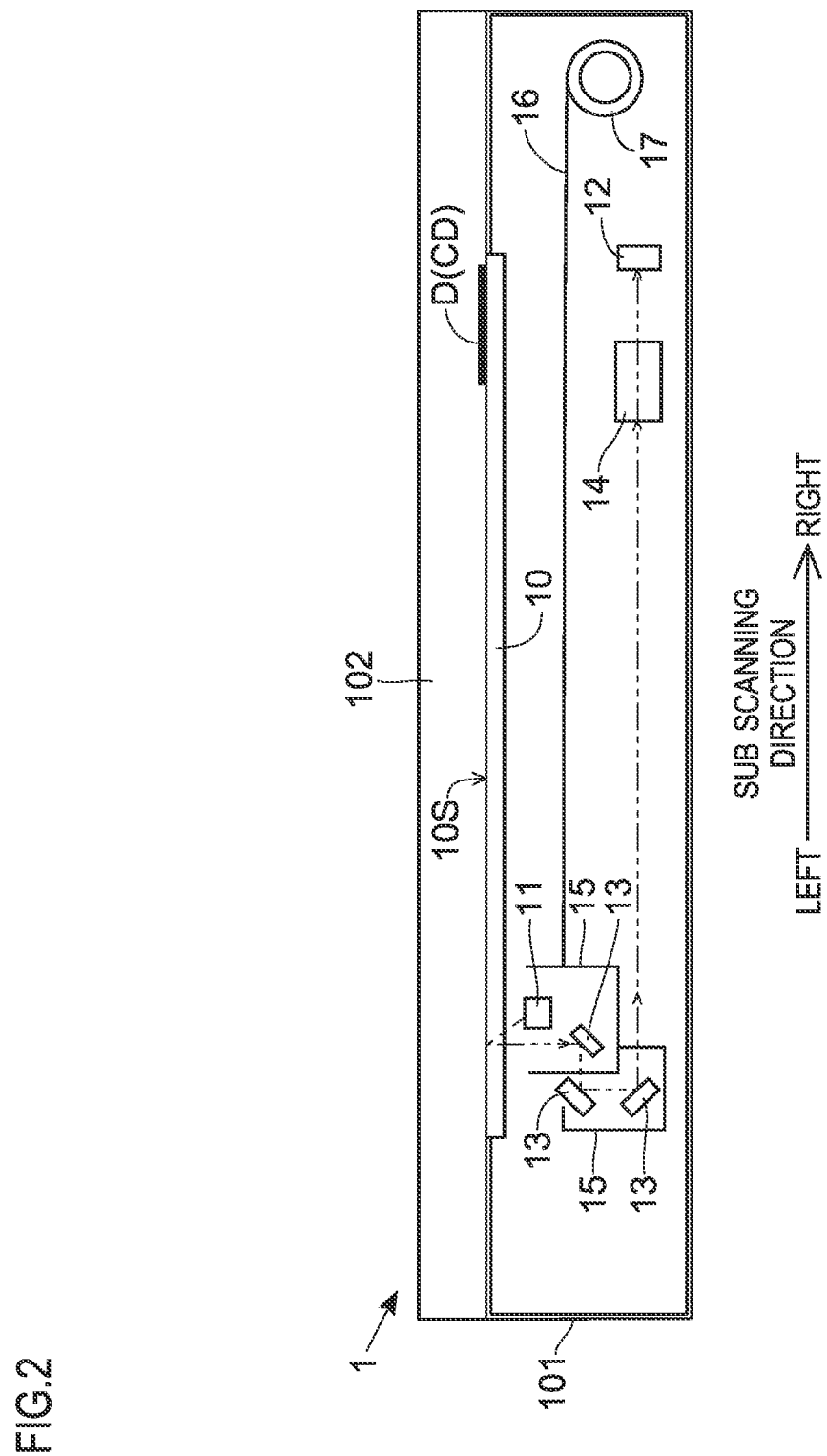
FIG. 2 is a schematic diagram showing a construction of an image reading portion in the multifunction peripheral according to the embodiment of the present invention.

As shown in FIG. 2, the image reading portion 1 includes a contact glass 10. The contact glass 10 is provided in an upper part of a housing 101 of the image reading portion 1. The top face of the contact glass 10 is a setting face 10S on which a document D is set. The image reading portion 1 reads the contact glass 10 and generates image data of the read area. When a document D is set on the setting face 10S, the document D set on the setting face 10S is read.

Figure 3:
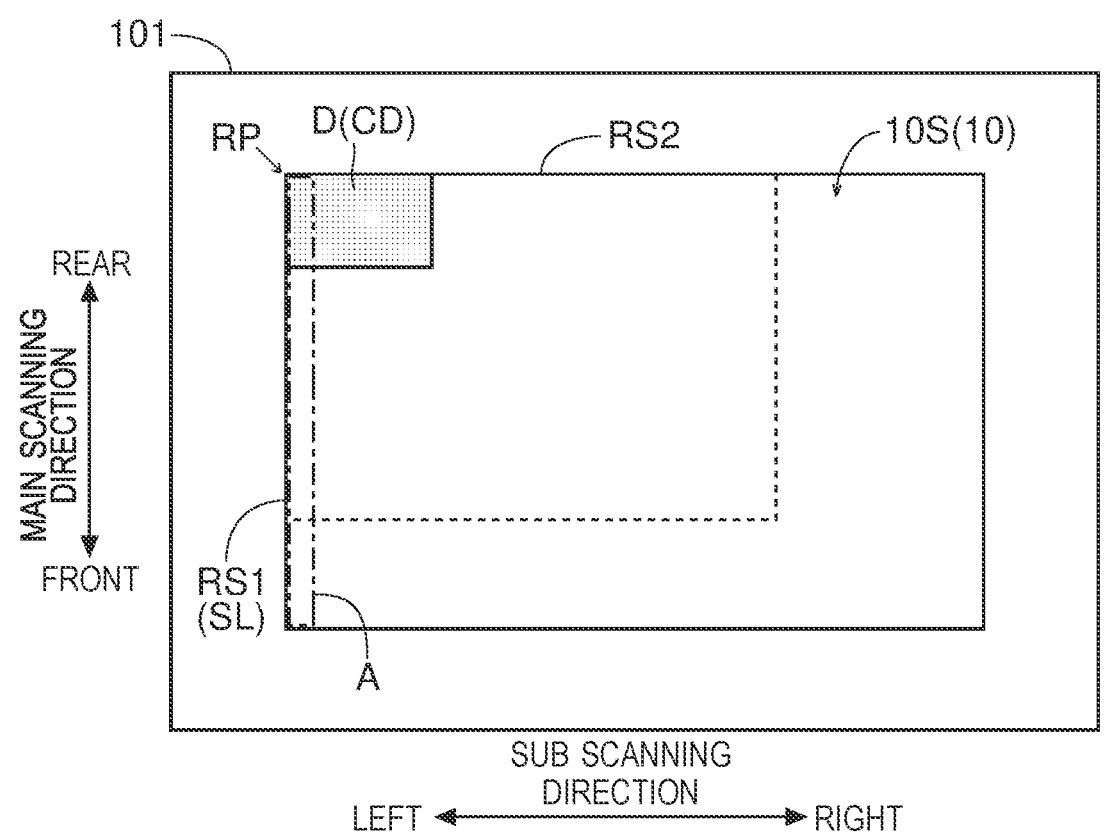
FIG. 3 is a plan view showing a contact glass in the multifunction peripheral according to the embodiment of the present invention.

As shown in FIG. 3, the setting face 10S is in a rectangular shape which is elongate in the left-right direction of the multifunction peripheral 100 as seen in a plan view. Of the four sides of the setting face 10S, a pair of shorter sides is parallel to the main scanning direction (the front-rear direction of the multifunction peripheral 100), and a pair of longer sides is parallel to the sub scanning direction (the direction perpendicular to the main scanning direction).

Here, of the pair of sides of the setting face 10S opposite from each other in the sub scanning direction (the pair of sides parallel to the main scanning direction), one side is set as a first reference side RS1 and, of the pair of sides of the setting face 10S opposite from each other in the main scanning direction (the pair of sides parallel to the sub scanning direction), one side is set as a second reference side RS2. The intersection point between the first and second reference sides RS1 and RS2 is set as a reference position RP. FIG. 3 illustrates an example where the position at the top left corner of the setting face 10S is set as the reference position RP.

The image reading portion 1 starts reading from a read start line SL. Here, the read start line SL is a line along the first reference side RS1. Thus, when a document D is set on the setting face 10S, a user aligns a corner of the document D with the reference position RP. The user also aligns, of the four sides of the document D, one with the first reference side RS1 and another with the second reference side RS2.

Figure 4:
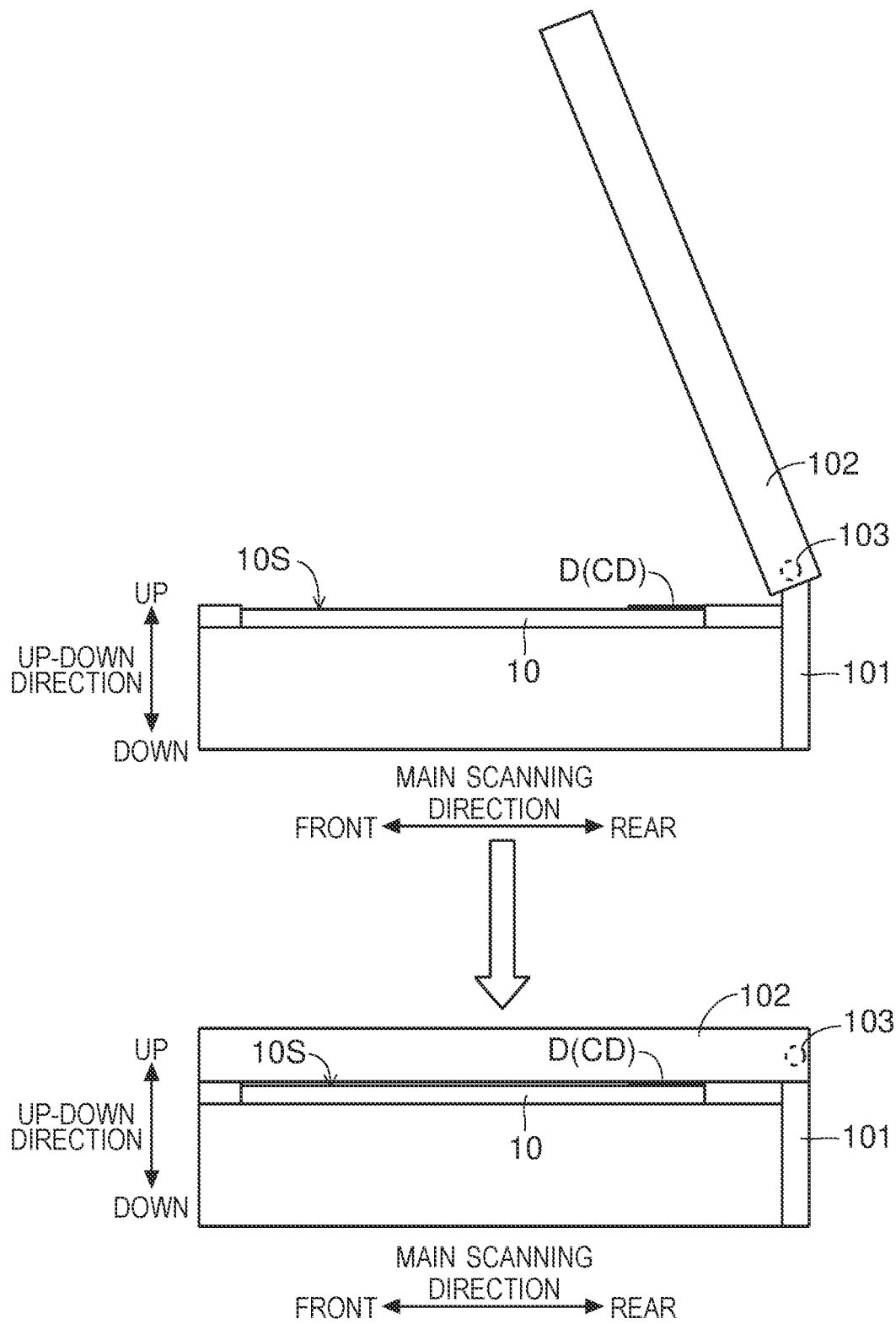
FIG. 4 is a diagram showing a document cover on the multifunction peripheral according to the embodiment of the present invention in an open and a closed state.

As shown in FIG. 4, a document cover 102 is provided on the housing 101. The document cover 102 opens and closes with respect to the setting face 10S. For example, a rotary shaft 103 is provided in a rear part of the housing 101. The document cover 102 is supported so as to be pivotable about the rotary shaft 103. The document cover 102, with its front part as a free end, pivots such that its front part swings up and down. Thus, by moving the front part of the document cover 102 up and down, it is possible to open and close the document cover 102 with respect to the setting face 10S.

When the document cover 102 is opened, the setting face 10S is exposed to allow selling of a document D on the selling face 10S (see the upper diagram in FIG. 4). When the document cover 102 is closed, the setting face 10S is covered by the document cover 102 (see the lower diagram in FIG. 4). When setting a document D on the setting face 10S, a user opens the document cover 102. After setting the document D on the selling face 102, the user closes the document cover 102. With the document cover 102 closed, the document D on the setting face 10S is pressed by the document cover 102.

As shown in FIG. 2, the image reading portion 1 includes a light source 11, an image sensor 12, a mirror 13, and a lens 14. These components of the image reading portion 1 are housed inside the housing 101.

The light source 11 includes a plurality of LED elements (unillustrated). The plurality of LED elements are arrayed in the main scanning direction (the direction perpendicular to the plane of FIG. 2). The light source 11 shines light toward the contact glass 10. The light from the light source 11 is transmitted through the contact glass 10. In an area where the document D is set, the light from the light source 11 is reflected from the document D.

The image sensor 12 includes a plurality of photoelectric conversion elements that are arrayed in the main scanning direction. The image sensor 12 receives the light reflected from the document D. Receiving the light, the image sensor 12 performs photoelectric conversion at each pixel line by line to store electric charge and outputs a signal in accordance with the stored electric charge.

The mirror 13 reflects the light reflected from the document D toward the lens 14. The lens 14 converges the light reflected from the mirror 13 to guide it to the image sensor 12.

The light source 11 and the mirror 13 are mounted on a carriage 15 that is movable in the sub scanning direction. The carriage 15 is connected to a wire 16. The wire 16 is wound on a winding drum 17. As the winding drum 17 rotates, the carriage 15 moves in the sub scanning direction. Thus, the light source 11 and the mirror 13 move in the sub scanning direction.

When a job involving reading by the image reading portion 1 (such as a copy job or a transmission job) is executed, the carriage 15 moves in the sub scanning direction (the direction from left to right as seen from in front). As the carriage 15 moves in the sub scanning direction, the light source 11 shines light toward the contact glass 10. The image sensor 12 repeatedly performs photoelectric conversion on the reflected light reflected from the document D. Thus, the document D is read line by line.

As shown in FIG. 1, the printing portion 2 includes a sheet conveying passage 20. In FIG. 1, the sheet conveying passage 20 is indicated by a broken line. The printing portion 2 prints an image on a sheet P that is conveyed along the sheet conveying passage 20. In a copy job, the printing portion 2 prints on a sheet P an image based on image data obtained through reading by the image reading portion 1. The printing portion 2 includes a sheet feeding portion 21, an image forming portion 22, and a fixing portion 23.

The sheet feeding portion 21 feeds a sheet P to the sheet conveying passage 20. The image forming portion 22 forms a toner image and transfers (prints) the toner image to the sheet P that is being conveyed. The fixing portion 23 heats and presses the sheet P being conveyed. The toner image is thus fixed to the sheet P.

The multifunction peripheral 100 is provided with an operation panel 3. The operation panel 3 includes a touch screen 31. The touch screen 31 displays a screen with software buttons, and accepts touch operation by a user on the displayed screen (software buttons).

The operation panel 3 also includes hardware buttons 32. There are a plurality of hardware buttons 32. The hardware buttons 32 include, for example, a Start button for accepting from a user a starting operation requesting execution of a job involving reading by the image reading portion 1.

Figure 5:
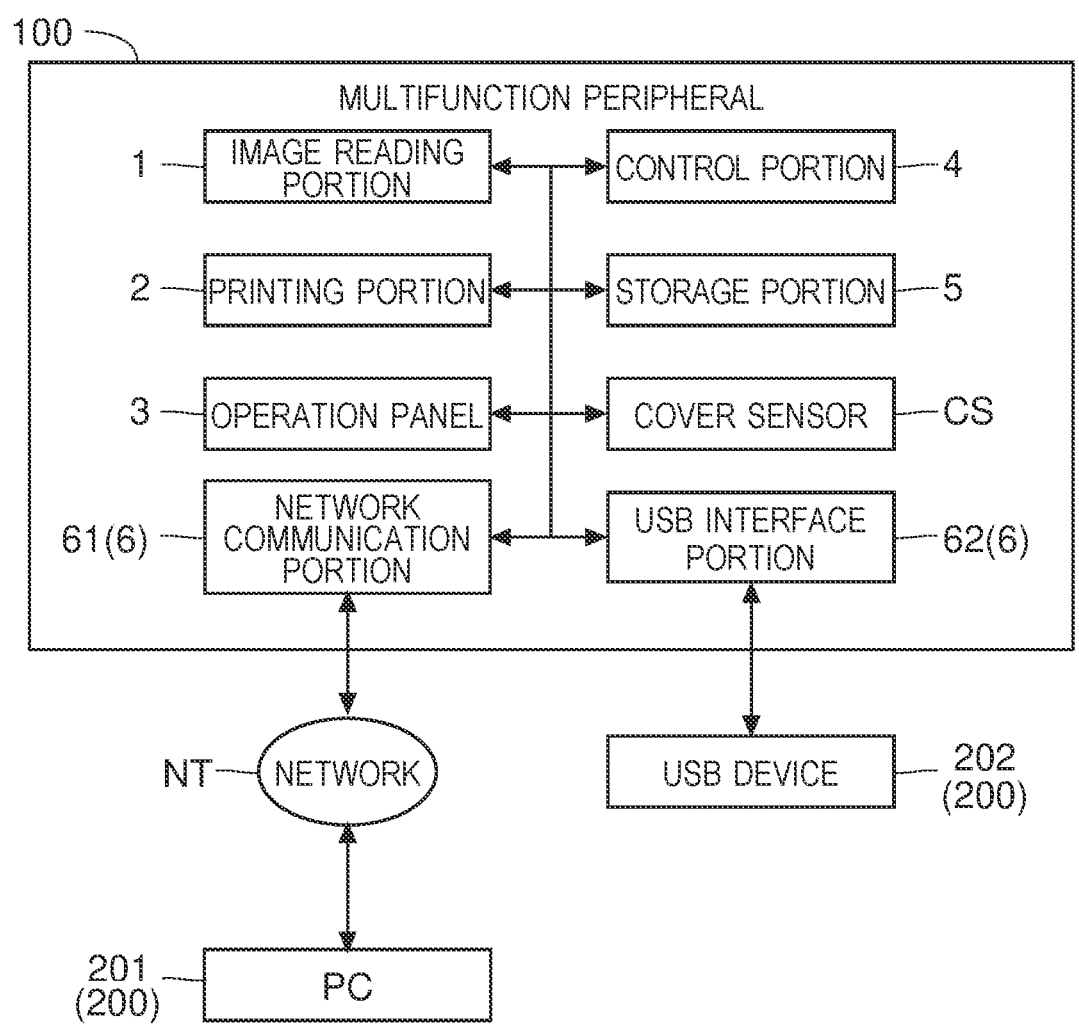
FIG. 5 is a block diagram showing a construction of the multifunction peripheral according to the embodiment of the present invention.

As shown in FIG. 5, the multifunction peripheral 100 includes a control portion 4 and a storage portion 5. The control portion 4 includes a CPU. The storage portion 5 includes a ROM and a RAM. The storage portion 5 is connected to the control portion 4. The storage portion 5 stores control programs and control data. The control portion 4 controls different parts of the multifunction peripheral 100 based on the control programs and the control data.

The image reading portion 1, the printing portion 2, and the operation panel 3 are connected to the control portion 4. The control portion 4 controls the reading operation by the image reading portion 1 as well as the printing operation by the printing portion 2. The control portion 4 controls the display operation by the operation panel 3 and senses operation performed on the operation panel 3.

To the control portion 4, a cover sensor CS is connected. The cover sensor CS is a sensor that senses whether the document cover 102 is open or closed. For example, used as the cover sensor CS is an optical sensor having a light emitting portion and a light receiving portion. The sensing target of the cover sensor CS is an actuator (unillustrated) which is movable up and down between the light emitting portion and the light receiving portion. The actuator is provided in the housing 101. The actuator is always urged upward.

When the document cover 102 is completely closed (see the lower diagram in FIG. 4), the actuator is kept pressed downward by the document cover 102. In this state, the optical path (the area between the light emitting portion and the light receiving portion) of the cover sensor CS is shielded by the actuator. On the other hand, when the document cover 102 is completely open (see the upper diagram in FIG. 4), the actuator is released from being pressed by the document cover 102. In this state, the optical path of the cover sensor CS is open.

When the document cover 101 transits from the open state to the closed state, the document cover 102 makes contact with the actuator and the actuator moves downward. When the document cover 102 is closed until the inclination angle of the document cover 102 (the angle relative to the setting face 10S) reaches a predetermined angle, the optical path of the cover sensor CS is shielded by the actuator. At this point, the output value of the cover sensor CS changes.

The control portion 4 monitors the output value of the cover sensor CS. The control portion 4, based on the output value of the cover sensor CS, senses whether the document cover CS is open or closed. The control portion 4, based on the output value of the cover sensor CS, senses the inclination angle of the up-to-then-open document cover 102 reaching a predetermined angle.

Here, before the start of a job (such as a copy job or a transmission job) involving reading by the image reading portion 1, a user opens the document cover 102 to set a document on the setting face 10S. Then, the user closes the document cover 102.

After the completion of a job involving reading by the image reading portion 1, the user opens the document cover 102 to remove the document D off the setting face 10S. Then, the user closes the document cover 102.

In this way, the document cover 102 is opened or closed before the start and after the completion of a job. That is, the control portion 4 senses the inclination angle of the up-to-then-open document cover 102 reaching a predetermined angle before the start and after the completion of a job.

The multifunction peripheral 100 also includes a network communication portion 61. The network communication portion 61 is an interface for connecting the multifunction peripheral 100 to a network NT such as the Internet. The network communication portion 61 includes a LAN communication circuit. The network communication portion 61 is connected to a wireless LAN access point.

The control portion 4 controls the network communication portion 61 to communicate with an external device connected to the network NT. The external device connected to the network NT is, for example, a PC 201 (personal computer) used by a user of the multifunction peripheral 100. Connecting the PC 201 to the multifunction peripheral 100 makes it possible to execute a transmission job in which image data is transmitted from the multifunction peripheral 100 to the PC 201. For example, it is possible to transmit image data obtained through reading by the image reading portion 1 to the PC 201.

The multifunction peripheral 100 also includes a USB interface portion 62. The USB interface portion 62 is an interface for connecting an external device to the multifunction peripheral 100 via USB. It is possible to connect a USB device 202 such as a USB memory to the multifunction peripheral 100. The USB interface portion 62 includes a USB communication circuit.

The control portion 4 controls the USB interface portion 62 to communicate with the USB device 202 connected to the multifunction peripheral 100. The control portion 4 writes information to the USB device 202 as well as reads information from the USB device 202. Connecting the USB device 202 to the multifunction peripheral 100 makes it possible to execute a transmission job in which image data is transmitted from the multifunction peripheral 100 to the USB device 202. For example, it is possible to transmit image data obtained through reading by the image reading portion 1 to the USB device 202.

The network communication portion 61 and the USB interface portion 62 correspond to an "output portion". In the following description, the network communication portion 61 and the USB interface portion 62 are collectively referred to as an output portion 6. Likewise, the PC 201 and the USB device 202 are collectively referred to as an external device 200. The control portion 4 makes the output portion 6 output image data to the external device 200.

<Transmission Job>

In a transmission job, image data obtained through reading by the image reading portion 1 is transmitted from the multifunction peripheral 100 to the external device 200. The external device 200 saves the image data received from the multifunction peripheral 100.

Before starting a transmission job, a user makes settings related to the transmission job (settings related to reading by the image reading portion 1). The operation panel 3 accepts the settings related to the transmission job. There are a plurality of setting items related to a transmission job. The plurality of setting items include "document size (reading range)", "transmission size", and "zoom".

Based on a set value for the setting item "document size", the control portion 4 sets a reading range for the image reading portion 1. Likewise, based on the set values for the setting items "transmission size" and "zoom", the control portion 4 performs image processing on image data obtained through reading by the image reading portion 1.

Here, assume that, as shown in FIG. 3, for a transmission job to be executed, a card document CD of an irregular size (a size smaller than a regular size) is set on the setting face 10S as a reading-target document D. The card document CD is, for example, an ID card such as a driver's license, a health insurance card, or a business card. In FIG. 3, the card document CD is indicated by a dotted pattern. The range that corresponds to A4 size, which is one of regular sizes, is enclosed by a broken line.

As a first example, assume that the set value for the setting item "document size" is set to A4 size, that the set value for the setting item "transmission size" is set to A4 size (the same size as the document size), and that the set value for the setting item "zoom" is set at 100%.

In this case, the control portion 4 sets, as the reading range for the image reading portion 1, the range corresponding to A4 size, as this is the set value for the setting item "document size" (the range enclosed by the broken line in FIG. 3). The control portion 4 makes the image reading portion 1 read the set reading range (the reading range that is set based on the set value for the setting item "document size"). The image reading portion 1 reads the set reading range to generate image data of the reading area (the area corresponding to the set reading range). Here, the set reading range is a range that corresponds to A4 size, and thus the image data of the reading area includes the image data of the card document CD.

The image data of the reading area corresponds to "first image data" and the image data of the card document CD corresponds to "second image data". In the following description, the image data of the reading area is referred to as the first image data and identified by the reference sign 11; the image data of the card document CD is referred to as the second image data and identified by the reference sign 12.

Figure 6:
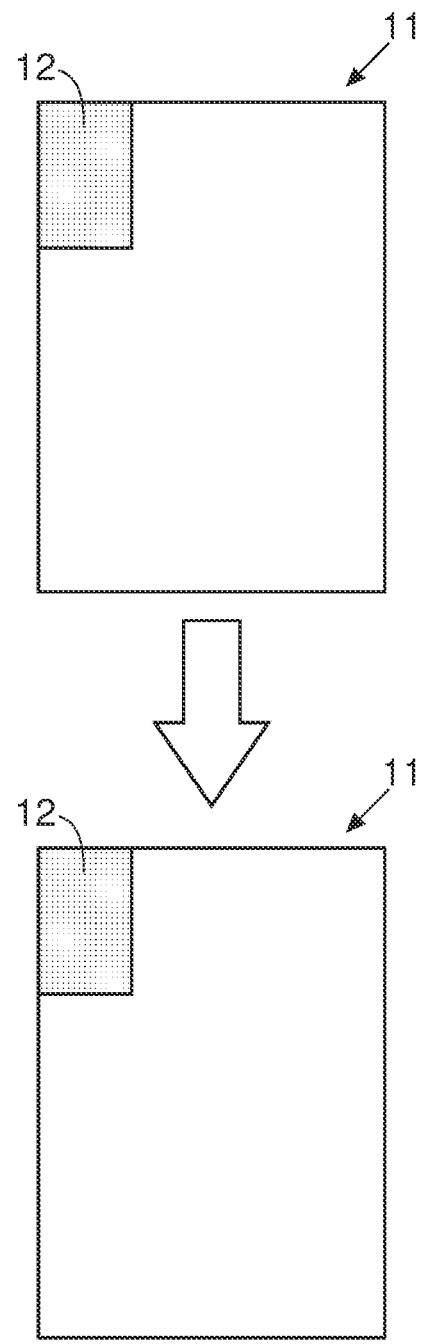
FIG. 6 is a diagram illustrating image data that is output when a transmission job is performed without using an output data selection function incorporated in the multifunction peripheral according to the embodiment of the present invention.

In the first example, image data as shown in the upper diagram in FIG. 6 is generated as the first image data 11. The first image data 11 includes the second image data 12. In FIG. 6, the second image data 12 is indicated by a dotted pattern. The same applies to similar diagrams that will be referred to in the following description.

After generating the first image data 11, the control portion 4 performs various types of image processing on the first image data 11. For example, density conversion processing, data format conversion processing, and the like are performed as image processing. The control portion 4 performs processing to adapt the size (the dimensions in the main and sub scanning directions) of the first image data 11 to the size indicated by the set value for the setting item "transmission size".

In the first example, the set value for the setting item "transmission size" is A4 size and the set value for the setting item "zoom" is 100%. Accordingly, the size of the first image data 11 is set to A4 size. The first image data 11 is not enlarged or reduced. The first image data 11 having undergone image processing is shown in the lower diagram in FIG. 6.

After image processing on the first image data 11, the control portion 4 makes the output portion 6 output the first image data 11 having undergone image processing. In the first example, the first image data 11 shown in the lower diagram in FIG. 6 is output.

The operation panel 3 accepts from a user the setting of the output destination. When the output destination is the PC 201, the control portion 4 controls the network communication portion 61 to transmit the first image data 11 having undergone image processing to the PC 201. When the output destination is the USB device 202, the control portion 4 controls the USB interface portion 62 to transmit the first image data 11 having undergone image processing to the USB device 202.

As a second example, assume that the set value for the setting item "document size" is set to A4 size, that the set value for the setting item "transmission size" is set to A5 size, and that the set value for the setting item "zoom" is set to automatic.

In this case, as in the first example, the reading range for the image reading portion 1 is set to the range corresponding to the A4 size. Then, the image reading portion 1 reads the set reading range. Thereby, as shown in the upper diagram in FIG. 7, the first image data 11 (the same first image data 11 as in the first example) including the second image data 12 is generated.

After generating the first image data 11, the control portion 4 performs image processing on the first image data 11. By performing image processing on the first image data 11, the control portion 4 adapts the size of the first image data 11 to the size indicated by the set value for the setting item "transmission size".

In the second example, the set value for the setting item "transmission size" is A5 size and the set value for the setting item "zoom" is automatic. Thus, the size of the first image data 11 is set to A5 size. In addition, the set value for the setting item "zoom" is automatic, and thus the first image data 11 is reduced to A5 size. The first image data 11 having undergone image processing (after reduction) is shown in the lower diagram in FIG. 7.

Figure 7:
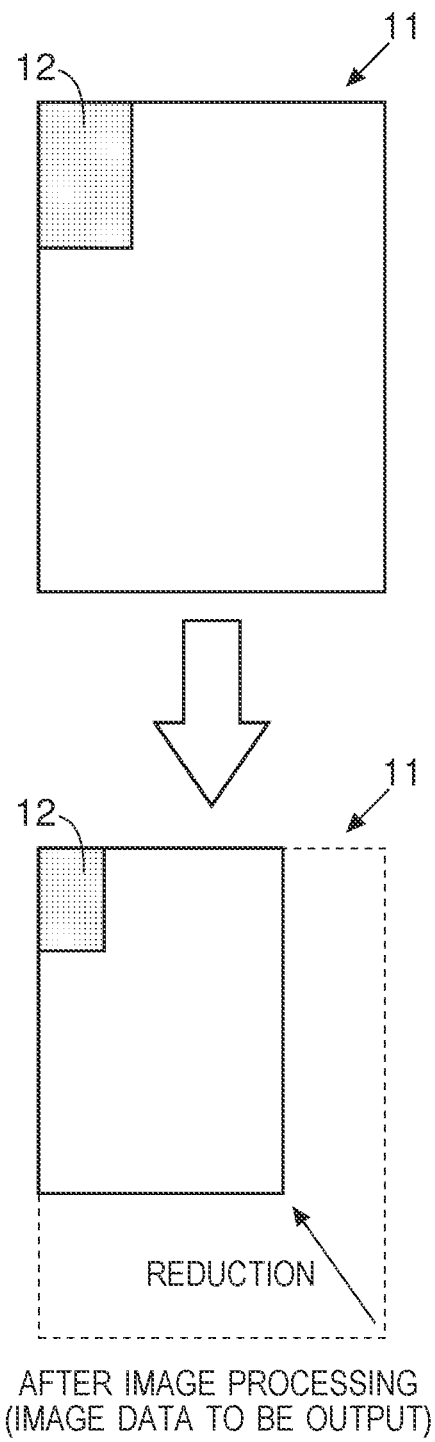
FIG. 7 is a diagram illustrating image data that is output when a transmission job is performed without using an output data selection function incorporated in the multifunction peripheral according to the embodiment of the present invention.

After image processing on the first image data 11, the control portion 4 makes the output portion 6 output the first image data 11 having undergone image processing. In the second example, the first image data 11 shown in the lower diagram in FIG. 7 is output.

As a third example, assume that the set value for the setting item "document size" is set to A4 size, that the set value for the setting item "transmission size" is set to A5 size, and that the set value for the setting item "zoom" is set at 100%.

In this case, as in the first and second examples, the range that corresponds to A4 size is set as the reading range. Then, the set reading range is read. Thereby, as shown in the upper diagram in FIG. 8, the first image data 11 (the same first image data 11 as in the first and second examples) including the second image data 12 is generated.

After generating the first image data 11, the control portion 4 performs image processing on the first image data 11. By performing image processing on the first image data 11, the control portion 4 adapts the size of the first image data 11 to the size indicated by the set value for the setting item "transmission size".

In the third example, the set value for the setting item "transmission size" is A5 size and the set value for the setting item "zoom" is 100%. Thus, the size of the first image data 11 is set to A5 size. In addition, the set value for the setting item "zoom" is 100%, and thus the first image data 11 is not reduced. In this case, trimming is performed on the first image data 11. The first image data 11 after image processing (after trimming) is shown in the lower diagram in FIG. 8. In the lower diagram in FIG. 8, the trimmed area in the first image data 11 is indicated by hatching.

Figure 8:
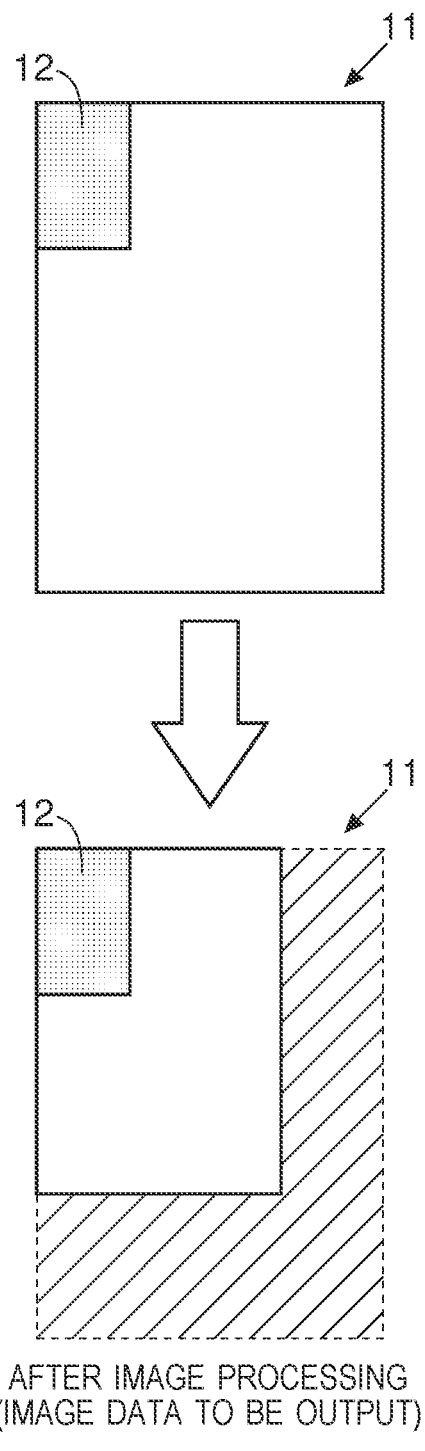
FIG. 8 is a diagram illustrating image data that is output when a transmission job is performed without using an output data selection function incorporated in the multifunction peripheral according to the embodiment of the present invention.

After image processing on the first image data 11, the control portion 4 makes the output portion 6 output the first image data 11 having undergone image processing. In the third example, the first image data 11 shown in the lower diagram in FIG. 8 is output.

<Output Data Selection Processing>

In the first to third examples, the first image data 11 is output. In other words, the image data other than the second image data 12 is output together with the second image data 12. The image data other than the second image data 12 includes no image of the card document CD. Thus, the image data other than the second image data 12 is unnecessary. However, some users may want to output the first image data 11.

Thus, in this embodiment, the multifunction peripheral 100 incorporates an output data selection function for outputting, of the first and second image data 11 and 12, the image data selected by a user. Processing related to the output data selection function (hereinafter called output data selection processing) is performed by the control portion 4. The control portion 4, prior to output data selection processing, performs condition judgment processing in which it checks whether a reading starting condition is met or not.

The control portion 4 performs output data selection processing if the output data selection function is enabled. A setting for enabling/disabling the output data selection function is accepted from a user on the operation panel 3. By enabling the output data selection function, it is possible to prevent output of the image data as shown in the lower diagrams in FIGS. 6 to 8.

First, with reference to the flow chart shown in FIG. 9, the procedure of condition judging processing performed by the control portion 4 will be described. Assume that, at the start of the procedure in FIG. 9, a user has completed the settings related to a transmission job. On completion of the settings related to the transmission job, the user sets a document D on the setting face 10S and closes the document cover 102. Thus, at the start of the procedure in FIG. 9, the document D is already set on the setting face 10S.

Figure 9:
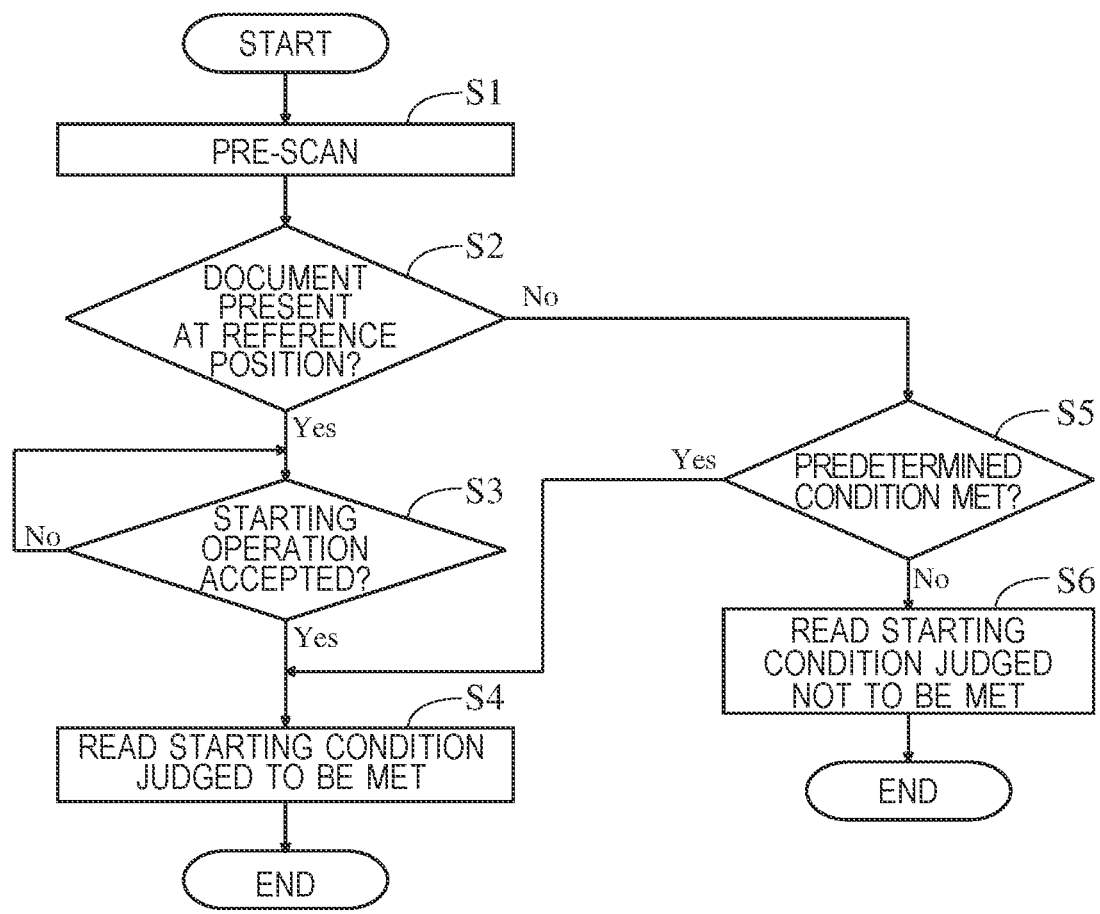
FIG. 9 is a flow chart showing a procedure of condition judgment processing performed by a control portion in the multifunction peripheral according to the embodiment of the present invention.

Here, at the start of the procedure in FIG. 9, a document D of a regular size may be set on the setting face 10S, or a document D (card document CD) of an irregular size may be set on the setting face 10S. A corner of the document D may or may not be aligned with the reference position RP.

The procedure in FIG. 9 starts when the document cover 102 is closed (immediately before the document cover 102 is completely closed). That is, the procedure in FIG. 9 starts when the control portion 4 senses that the document cover 102 is closed until the inclination angle of the document cover 102 reaches a predetermined angle.

In step S2, the control portion 4 makes the image reading portion 1 perform pre-scanning. In pre-scanning, the image reading portion 1 reads, of the contact glass 10, a predetermined area A (see FIG. 3) including the reference position RP. In pre-scanning, a predetermined number of lines starting at the read start line SL, are read. In FIG. 3, the predetermined area A is indicated by a dash-dot line. In the following description, reading for generating the first image data 11 (reading of the set reading range) is called ordinary reading for distinction from pre-scanning.

In step S2, the control portion 4, based on the image data obtained through the pre-scanning, judges whether the document D is present at the reference position RP. If the document D (card document CD) is set in a state as shown in FIG. 3, it is judged that the document D is present at the reference position RP. Even when the document D is set on the setting face 10S, if a corner of the document D is not aligned with the reference position RP, it is judged that no document D is present at the reference position RP.

Here, if the control portion 4 judges that the document D is present at the reference position RP, a starting operation requesting execution of a transmission job (the operation of pressing the Start button on the operation panel 3) is validated. On the other hand, if the control portion 4 judges that no document D is present at the reference position RP, the starting operation requesting execution of the transmission job is invalidated.

In step S2, if the control portion 4 judges that the document D is present at the reference position RP, the procedure proceeds to step S3. That is, if the starting operation on the operation panel 3 is validated, the procedure proceeds from step S2 to step S3. In step S3, the control portion 4 judges whether the operation panel 3 has accepted the starting operation. If the control portion 4 judges that the starting operation has been accepted, the procedure proceeds to step S4. If the control portion 4 judges that the starting operation has not been accepted, the procedure of step S4 is repeated.

In step S4, the control portion 4 judges that the reading starting condition is met. That is, if a user has aligned a corner of the document D with the reference position RP, when the user then performs the starting operation on the operation panel 3, the transmission job (reading by the image reading portion 1) is started.

In step S2, when the control portion 4 judges that no document D is present at the reference position RP, the procedure proceeds to step S5. That is, when the starting operation on the operation panel 3 is invalidated, the procedure proceeds from step S2 to step S5. In step S5, the control portion 4 judges whether a predetermined condition is met.

Here, the processing at step S5 will be described in detail. On completing the transmission job involving ordinary reading, the control portion 4 starts to count time. Then, in judging whether the predetermined condition is met, the control portion 4 judges whether the time that has elapsed since the previous (latest) transmission job was completed has reached a predetermined time (for example, several tens of minutes to several minutes). If the elapsed time has reached the predetermined time, the control portion 4 judges that the predetermined condition is met.

In addition, on completing the transmission job involving ordinary reading, the control portion 4 makes the operation panel 3 accept a prescribed ending operation as an operation for requesting ending of the transmission job. The operation panel 3 accepts an operation on a predetermined hardware button 32 as the ending operation. Then, in judging whether the predetermined condition is met, the control portion 4 judges whether the operation panel 3 has accepted the ending operation after the previous transmission job was completed. If the operation panel 3 has accepted the ending operation, the control portion 4 judges that the predetermined condition is met.

Even when the operation panel 3 has not accepted the ending operation, if the time that has elapsed since the previous transmission job was completed has reached the predetermined time, the control portion 4 judges that the predetermined condition is met. Similarly, even when the time that has elapsed since the previous transmission job was completed has not reached the predetermined time, if the operation panel 3 has accepted the ending operation, the control portion 4 judges that the predetermined condition is met.

Figure 10:
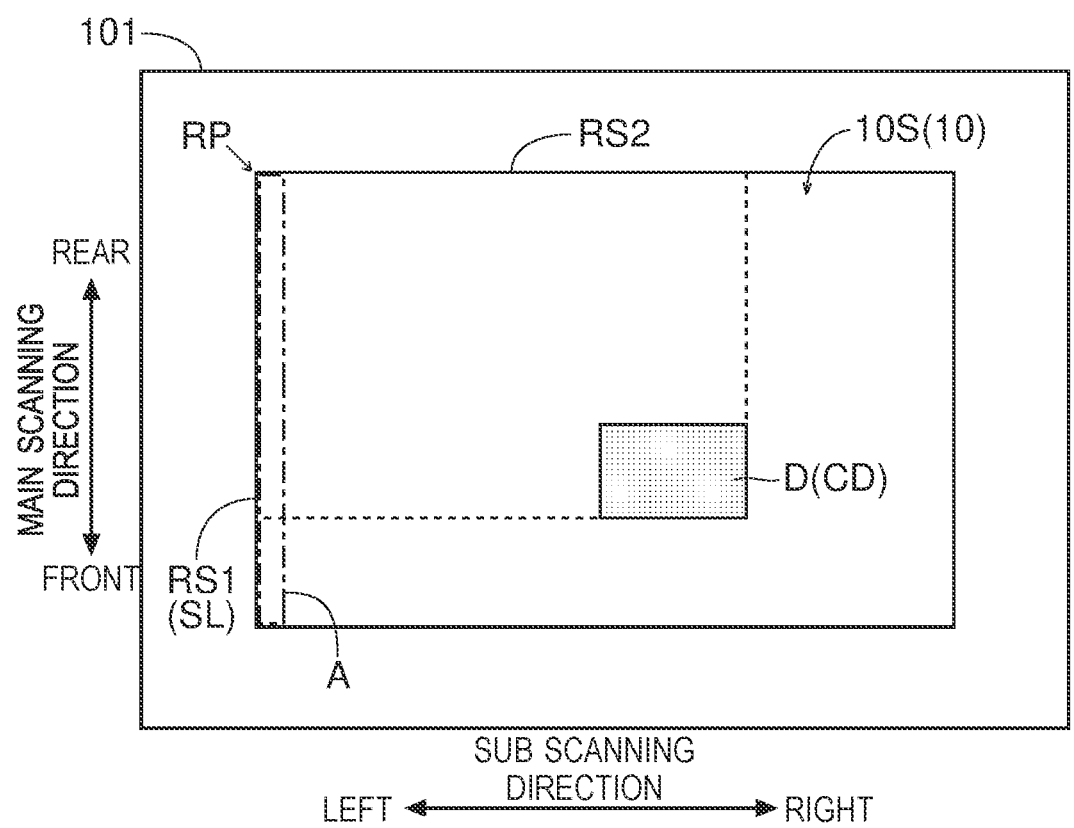
FIG. 10 is a diagram showing a state where a corner of a document set on the contact glass in the multifunction peripheral according to the embodiment of the present invention is not aligned with a reference position.

In step S5, if the control portion 4 judges that the predetermined condition is met, the procedure proceeds to step S4. If the predetermined condition is met, there is a high probability that a user has opened and closed the document cover 102 to set the document D on the setting face 10S. In other words, the document D is likely to be set on the setting face 10S. After the time that has elapsed since the previous transmission job was completed has reached the predetermined time, or, after the operation panel 3 accepts the ending operation after the completion of the previous transmission job, if, for example, a user sets the document D (card document CD) on the setting face 10S in a state as shown in FIG. 10 and closes the document cover 102, it is judged that the predetermined condition is met.

If the procedure proceeds from step S5 to step S4, the control portion 4 judges that the reading starting condition is met. That is, even when a user does not align a corner of the document D with the reference position RP (even when the starting operation on the operation panel 3 is invalidated), if the time that has elapsed since the previous transmission job was completed has reached a predetermined time or the operation panel 3 has accepted the ending operation after the completion of previous transmission job, a transmission job is started automatically (forcibly) even if the user does not perform the starting operation on the operation panel 3. Here, even if the user performs the operation of pressing the Start button on the operation panel 3, that operation is not accepted (is invalid) as the starting operation.

In step S5, if the control portion 4 judges that the predetermined condition is not met, the procedure proceeds to step S6. When the predetermined condition is not met, there is a high probability that a user has opened and closed the document cover 102 to remove the document D off the setting face 10S after the completion of a transmission job. In other words, the document D is unlikely to be set on the setting face 10S. Thus, in step S6, the control portion 4 judges that the reading starting condition is not met. In this case, the transmission job (reading by the image reading portion 1) is not started.

Next, with reference to the flow chart shown in FIG. 11, the procedure of output data selection processing performed by the control portion 4 will be described. The procedure in FIG. 11 starts when the control portion 4 judges that the reading starting condition is met.

In step S11, the control portion 4 sets a reading range for the image reading portion 1. Then, the control portion 4 makes the image reading portion 1 read the set reading range. The image reading portion 1 reads the set reading range to generate the first image data 11 (image data in the reading area).

In step S12, the control portion 4 senses the size of the document D that is set on the setting face 10S. Here, the control portion 4 recognizes the document area (the area where the image of the document D is present) in the first image data 11. For example, the control portion 4 detects the outline (the image of the edges constituting the outline) of the document D by performing edge detection processing on the first image data 11. The control portion 4 recognizes the area enclosed by the outline detected by the edge detection processing as the document area. Then, the control portion 4 senses the size (dimensions in the main and sub scanning directions) of the document area within the first image data 11 as the size of the document D set on the setting face 10S.

In step S13, the control portion 4 judges whether the sensed size of the document D (hereinafter called a sensed size) is within a predetermined range. The predetermined range involves a range in the main scanning direction (hereinafter called a first range) and a range in the sub scanning direction (hereinafter called a second range). For example, the maximum value of the first range is 210 mm, and the minimum value of the first range is 50 mm the maximum value of the second range is 210 mm, and the minimum value of the second range is 50 mm.

When the dimension of the sensed size in the main scanning direction is within the first range and in addition the dimension of the sensed size in the sub scanning direction is within the second range, the control portion 4 judges that the sensing range is within the predetermined range. That is, even when the dimension of the sensed size in the main scanning direction is within the first range, if the dimension of the sensed size in the sub scanning direction is beyond the second range, the control portion 4 judges that the sensing range is out of the predetermined range. Likewise, even when the dimension of the sensed size in the sub scanning direction is within the second range, if the dimension of the sensed size in the main scanning direction is out of the first range, it is judged that the sensing range is beyond the predetermined range.

In step S13, if the control portion 4 judges that the sensed size is within the predetermined range, the procedure proceeds to step S14. When the sensed size is within the predetermined range, there is a high probability that an ID card (card document CD) is set as the reading-target document D.

In step S11, the image reading portion 1 performs pre-scanning. Thus, when the document D is at the reference position RP, it is possible to sense the dimension in the main scanning direction of the document D set on the setting face 10S based on the image data obtained through pre-scanning. Accordingly, for a case where the document D is at the reference position RP, a configuration as described below is also possible as a modified example.

In the configuration of the modified example, the control portion 4, based on the image data obtained through the pre-scanning, senses the dimension in the main scanning direction of the document D set on the setting face 10S to judge whether the sensed dimension is within the first range. Then, if the control portion 4 judges that the dimension in the main scanning direction of the document D set on the setting face 10S is within the first range, the procedure proceeds to step S14.

In step S14, the control portion 4 performs cropping in which it extracts the image data of the document D (image data of the document area detected by edge detection processing) from the first image data 11. That is, the control portion 4 extracts the second image data 12 from the first image data 11. The control portion 4 performs processing to correct skew and distortion in the second image data 12 extracted by the cropping.

Then, in step S15, the control portion 4 generates a first preview image 71 (see the lower diagrams in FIGS. 12 and 13) corresponding to the first image data 11. The control portion 4 also generates a second preview image (see the lower diagrams in FIGS. 12 and 13) corresponding to the second image data 12. In other words, the control portion 4 generates display data of both the first and second image data 11 and 12.

In step S16, the control portion 4 makes the operation panel 3 accept a selection operation for selecting which of the first and second image data 11 and 12 is to be output.

Figure 12:
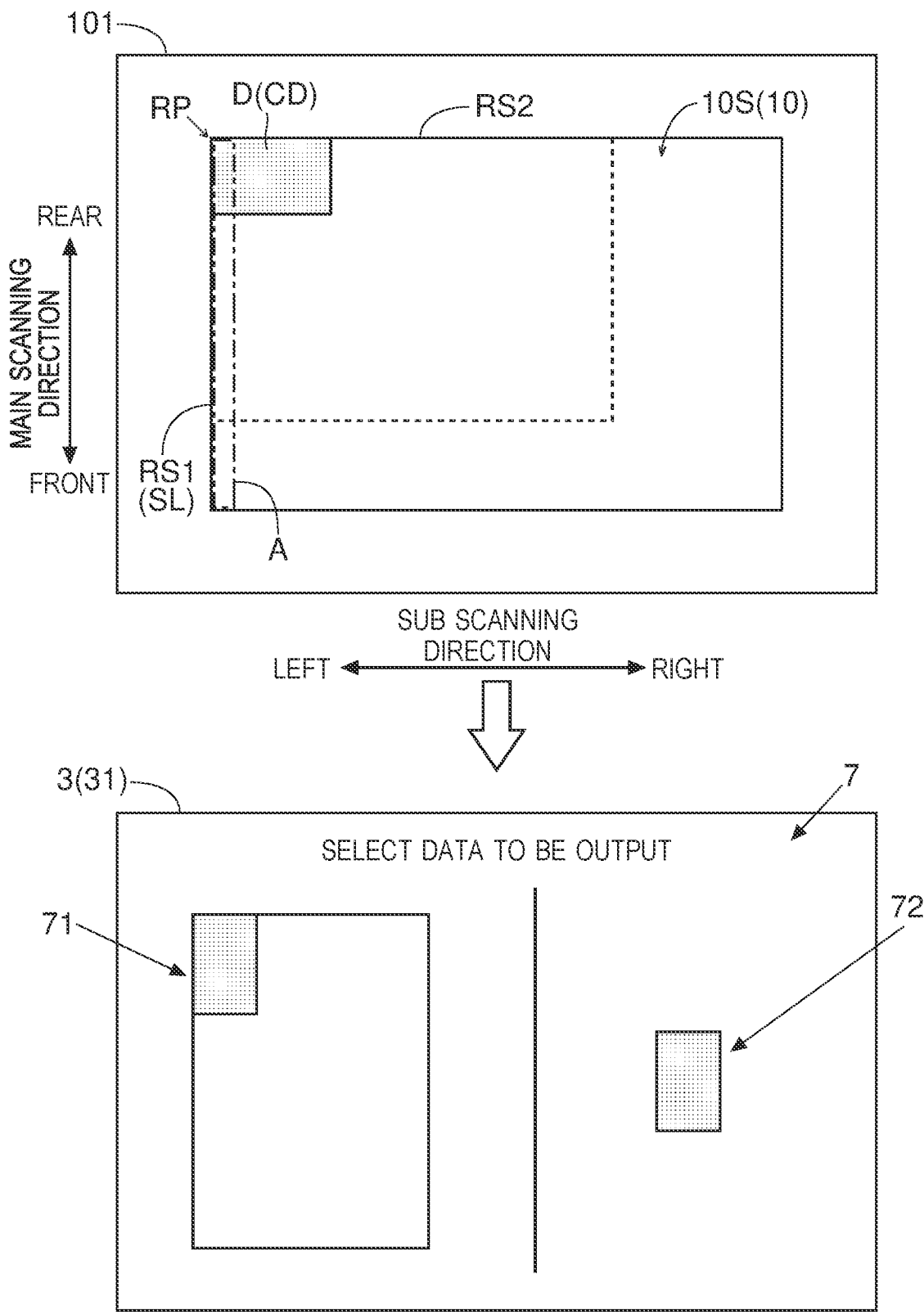
FIG. 12 is a diagram illustrating a preview image displayed by an operation panel in the multifunction peripheral according to the embodiment of the present invention.
Figure 13:
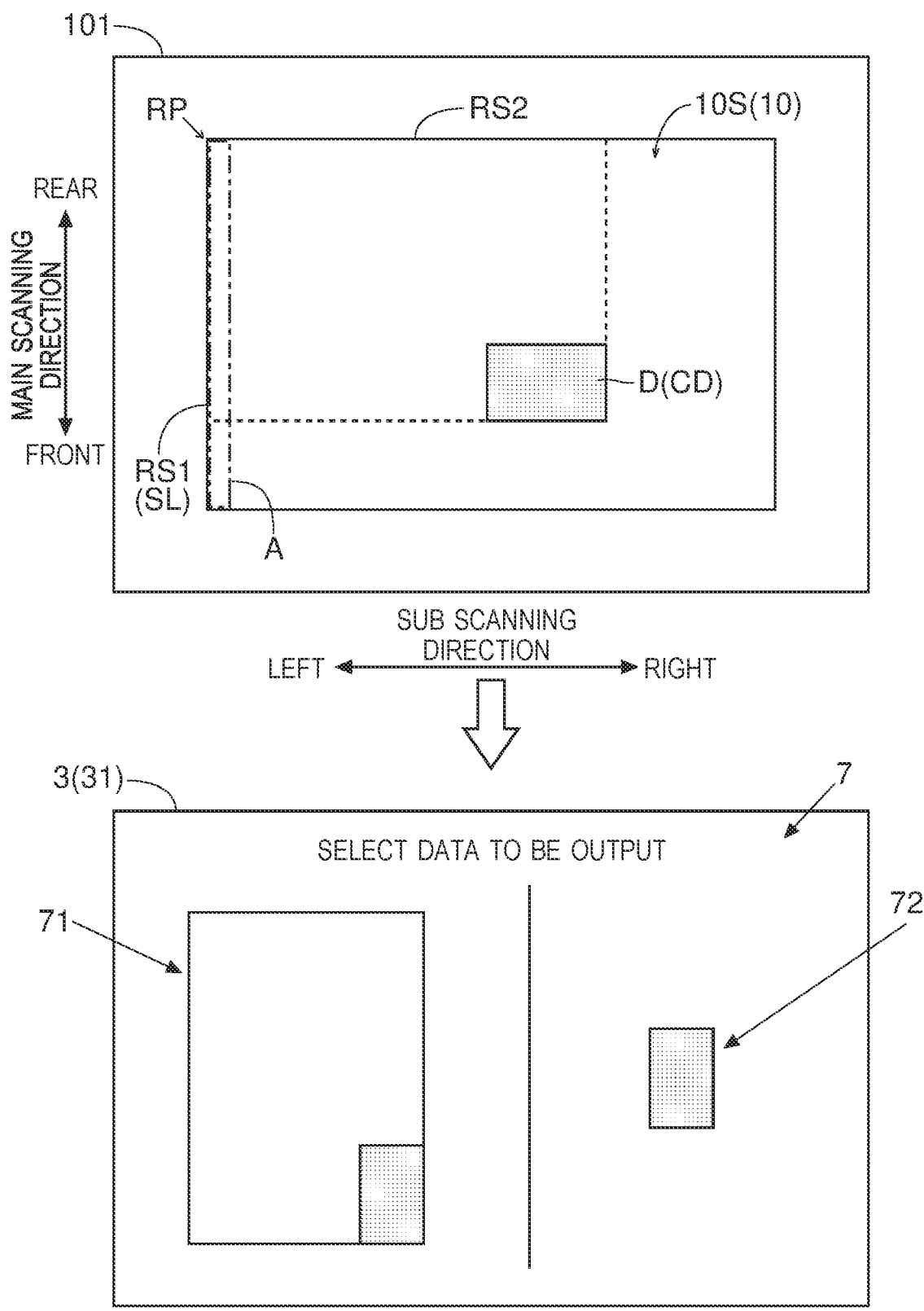
FIG. 13 is a diagram illustrating a preview image displayed by the operation panel in the multifunction peripheral according to the embodiment of the present invention.

Here, as shown in the lower diagrams in FIGS. 12 and 13, the control portion 4 makes the operation panel 3 display a selection screen 7 showing the first and the second preview images 71 and 72 on it. The operation panel 3 displays the selection screen 7 and accepts a selection operation from a user.

When a card document CD is set as the reading-target document D and a corner of the card document CD is aligned with the reference position RP (see the upper diagram in FIG. 12), the selection screen 7 as shown in the lower diagram in FIG. 12 is displayed. When a card document CD is set as the reading-target document D and a corner of the card document CD is not aligned with the reference position RP (see the upper diagram in FIG. 13), the selection screen 7 as shown in the lower diagram in FIG. 13 is displayed.

While the selection screen 7 is displayed, the operation panel 3 accepts a touch operation (for example, a tap operation) on the display area of either of the first and the second preview images 71 and 72 as the selection operation. On sensing the selection operation on the first preview image 71, the control portion 4 judges that the first image data 11 is selected. On sensing the selection operation on the second preview image 72, the control portion 4 judges that the second image data 12 is selected.

Figure 11:
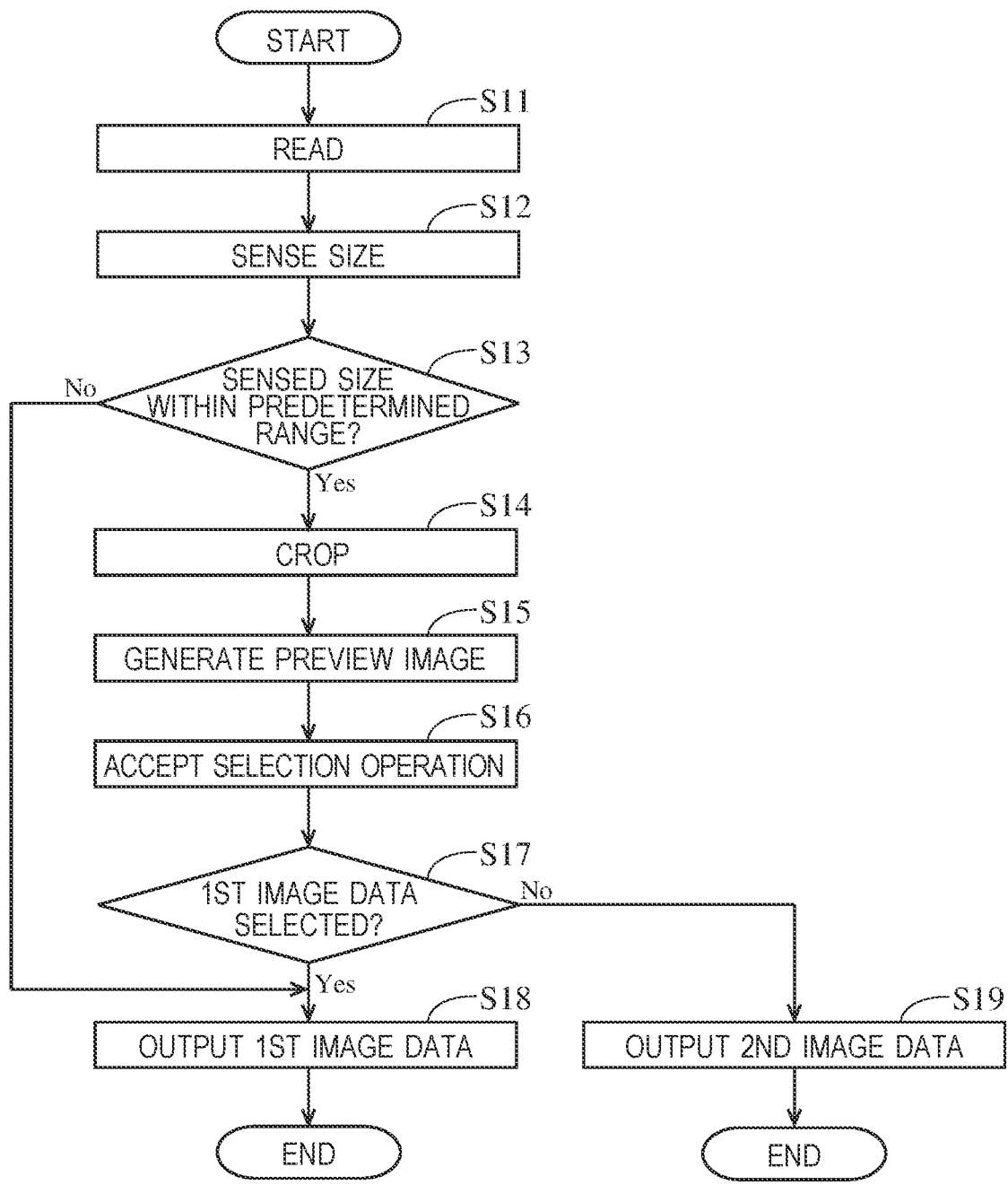
FIG. 11 is a flow chart showing a procedure of output data selection processing performed by the control portion in the multifunction peripheral according to the embodiment of the present invention.

Back in FIG. 11, in step S17, the control portion 4 judges whether the first image data 11 is selected or not. If the control portion 4 judges that the first image data 11 is selected, the procedure proceeds to step S18. If the control portion 4 judges that the second image data 12 is selected (that the first image data 11 is not selected), the procedure proceeds to step S19.

In step S18, the control portion 4 performs image processing on the first image data 11. Then, the control portion 4 makes the output portion 6 output the first image data 11 having undergone image processing. On the other hand, in step S19, the control portion 4 performs image processing on the second image data 12. Then, the control portion 4 makes the output portion 6 output the second image data 12 having undergone image processing.

In step S13, if the control portion 4 judges that the sensed size is out of the predetermined range, the procedure proceeds to step S18. When the sensed size is out of the predetermined size, it means that the document D set on the setting face 10S is not a card document CD. In other words, the document D of a regular size is likely to be set on the setting face 10S. In yet other words, there is a high probability that the size indicated by the set value (the set value set by a user) for the selling item "document size" coincides with the size of the document D that is actually set on the setting face 10S. Thus, if the sensed size is out of the predetermined range, the procedure proceeds to step S18.

Figure 14:
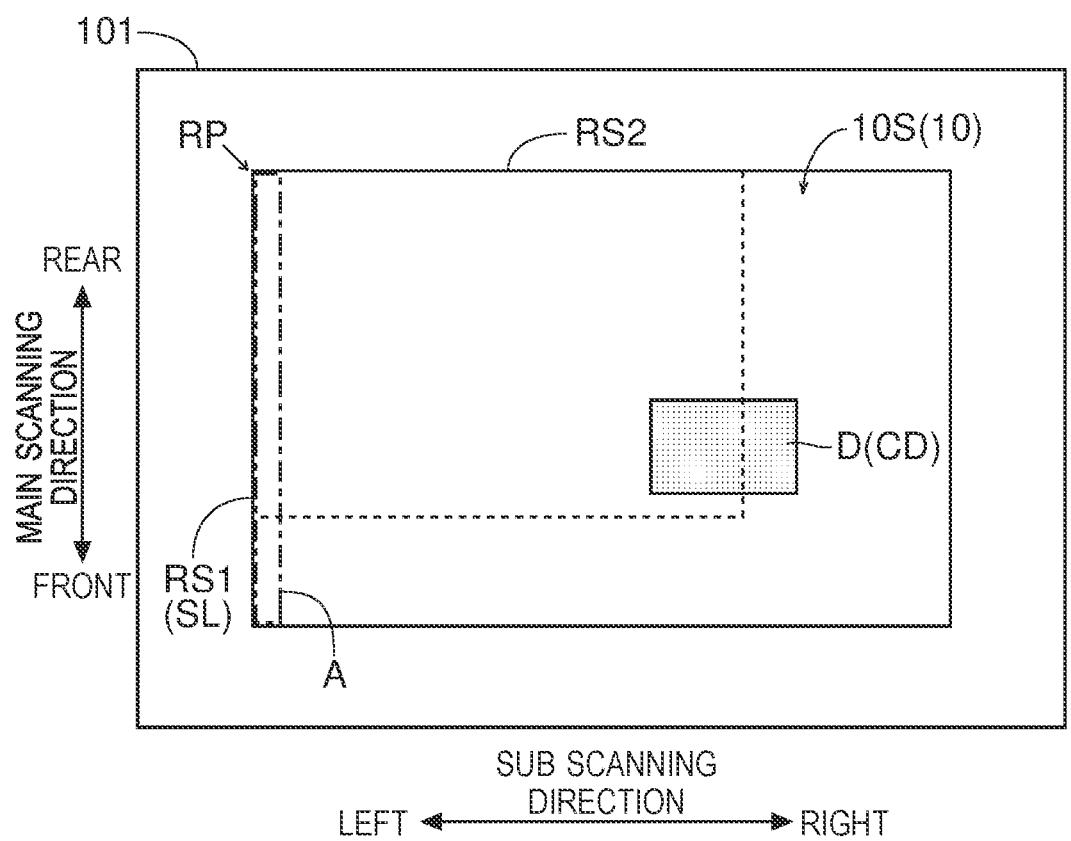
FIG. 14 is a diagram showing a state where a document set on the contact glass in the multifunction peripheral according to the embodiment of the present invention is out of a reading range.

Here, assume that, for example, the set value for the setting item "document size" is set to A4 size. Assume also that the document D that is actually set on the setting face 10S is a card document CD. Furthermore, assume that the setting position of the card document CD on the setting face 10S is out of the range corresponding to A4 size. This state is shown in FIG. 14. In FIG. 14, the card document CD is indicated by a dotted pattern, and the range corresponding to A4 size is enclosed by a broken line.

In this example, if only the set reading range (the range corresponding to A4 size) is read, the image data of the card document CD (the second image data 12) is interrupted. Thus, when the document D is not present at the reference position RP (when it can be the card document CD that is set on the setting face 10S), the entire surface of the contact glass 10 may be read by ordinary reading.

As described above, the multifunction peripheral 100 (image forming apparatus) according to this embodiment includes an operation panel 3 that displays an image and accepts operations from a user, an output portion 6 that outputs image data to an external device 200, an image reading portion 1 that performs ordinary reading in which it reads a contact glass 10 with a document D set on it to generate first image data 11, which is the image data of the read area, and a control portion 4 that performs output data selection processing. In performing output data selection processing, the control portion 4 extracts from the first image data 11 second image data 12, which is the image data of the document D. The control portion 4 also makes the operation panel 3 display a first preview image 71 corresponding to the first image data 11 and a second preview image 72 corresponding to the second image data 12, as well as makes the operation panel 3 accept selection operation for selecting either the first or second preview image 71 or 72. If the first preview image 71 is selected, the control portion 4 makes the output portion 6 output the first image data 11. If the second preview image 72 is selected, the control portion 4 makes the output portion 6 output the second image data 12.

In the configuration of this embodiment, after ordinary reading by the image reading portion 1 is completed, before image data is output to the external device 200, selection of which of the first and the second image data 11 and 12 to output is accepted. Thus, of the image data obtained through ordinary reading, the image data of an area desired by a user can be output. If a user selects the second image data 12, of the image data of the reading area read by the image reading portion only the image data inside the document area is output, and the image data outside the document area is not output. This is convenient for a user who wishes to output only the image data of the document area. On the other hand, if a user selects the first image data 11, the image data of the entire reading region read by the image reading portion 1 is output, and this is convenient for a user who wishes to output the image data of the entire reading area.

Furthermore, with both the first and second preview images 71 and 72 displayed, it is possible to select which of the first and second image data 11 and 12 to output after checking their output results. This further improves user convenience.

In this embodiment, as described above, the control portion 4 senses the size of the document D set on the contact glass 10. Then, the control portion 4 makes the operation panel 3 accept selection operation if the size of the document D is within a predetermined range. If the size of the document D is out of the predetermined range, the control portion 4, instead of making the operation panel 3 accept selection operation, makes the output portion 6 output the first image data 11. In this way, it is possible to prevent unnecessary acceptance of selection of image data to be output to the external device 200.

In this embodiment, as described above, when the document cover 102 is closed, the control portion 4 makes the image reading portion 1 read (pre-scan), of the contact glass 10, the predetermined area A including the reference position RP and, based on the image data obtained through reading of the predetermined area A, judges whether the document D is present at the reference position RP. If the document D is present at the reference position RP, after the operation panel 3 accepts a starting operation, the control portion 4 makes the image reading portion 1 perform ordinary reading. On the other hand, if the document D is not present at the reference position RP, even if the operation panel 3 has not accepted a starting operation, the control portion 4 makes the image reading portion 1 perform ordinary reading.

Here, if the reading-target document D is a card document CD, in setting the document D on the contact glass 10, some user may not align a corner of the document D with the reference position RP. Thus, a configuration is preferable where, when the document cover 102 is closed, ordinary reading is performed even if the document D is not present at the reference position RP.

The document cover 102 is opened and closed also when a user removes the document D off the contact grass 10. That is, the document cover 102 may be closed with no document D set on the contact glass 10.

Thus, in this embodiment, as described above, after completion of ordinary reading, the control portion 4 does not make the image reading portion 1 perform ordinary reading until a predetermined condition is met even if the control portion 4 senses, if the document cover 102 is closed, that the document D is not present at the reference position RP. The control portion 4 judges that the predetermined condition is met if the time that has elapsed since the ordinary reading was completed has reached a predetermined time, or if the operation panel 3 has accepted an ending operation after the completion of ordinary reading. In this way, it is possible to prevent the image reading portion 1 from performing reading with no document D set on the contact glass 10. That is, it is possible to prevent unnecessary reading by the image reading portion 1.

The embodiments disclosed herein should be understood to be in every aspect illustrative and not restrictive. The scope of the present disclosure is defined not by the description of the embodiments given above but by the appended claims, and should be understood to encompass any modifications made in the sense and scope equivalent to those of the claims.

The invention claimed is:

1. An image forming apparatus comprising:
   an operation panel that displays an image and accepts operations from a user;
   an output portion that outputs data to an external device;
   an image reading portion that performs ordinary reading in which the image reading portion reads a contact glass with a document set thereon to generate first image data, which is image data of a read area; and
   a control portion that performs output data selection processing,
   wherein
   in performing the output data selection processing, the control portion
      extracts from the first image data second image data, which is image data of the document,
      makes the operation panel display a first preview image corresponding to the first image data and a second preview image corresponding to the second image data, as well as makes the operation panel accept selection operation for selecting either the first or second preview image, and
      if the first preview image is selected, makes the output portion output the first image data and, if the second preview image is selected, makes the output portion output the second image data;
   wherein
   the control portion
      senses a size of the document set on the contact glass,
      if the size of the document is within a predetermined rang makes the operation panel accept the selection operation, and
      if the size of the document is out of the predetermined range, without making the operation panel accept the selection operation, makes the output portion output the first image data.

2. An image forming apparatus comprising:
   an operation panel that displays an image and accepts operations from a user;
   an output portion that outputs data to an external device;
   an image reading portion that performs ordinary reading in which the image reading portion reads a contact glass with a document set thereon to generate first image data, which is image data of a read area;
   a document cover that is openably fitted to the contact glass; and
   a control portion that performs output data selection processing,
   wherein
   in performing the output data selection processing, the control portion
      extracts from the first image data second image data, which is image data of the document, and
      makes the operation panel display a first preview image corresponding to the first image data and a second preview image corresponding to the second image data, as well as makes the operation panel accept selection operation for selecting either the first or second preview image,
      if the first preview image is selected, makes the output portion output the first image data and, if the second preview image is selected, makes the output portion output the second image data;
   wherein
   if the document cover is closed, the control portion makes the image reading portion read, of the contact glass, a predetermined area including a reference position and, based on image data obtained through reading of the predetermined area, judges whether the document is present at the reference position,
   if the document is present at the reference position, after the operation panel accepts a starting operation, the control portion makes the image reading portion perform the ordinary reading, and
   if the document is not present at the reference position, even if the operation panel has not accepted the starting operation, the control portion makes the image reading portion perform the ordinary reading.

3. The image forming apparatus according to claim 2, wherein
   after completion of the ordinary reading, the control portion does not make the image reading portion perform the ordinary reading until a predetermined condition is met even if the control portion senses, when the document cover is closed, that the document is not present at the reference position.

4. The image forming apparatus according to claim 3, wherein
   the control portion judges that the predetermined condition is met when time that has elapsed since the ordinary reading was completed has reached a predetermined time, or when the operation panel has accepted an ending operation after the completion of the ordinary reading.

* * * * *